(12) United States Patent
Rodriguez Fernandez et al.

(10) Patent No.: US 12,397,504 B2
(45) Date of Patent: Aug. 26, 2025

(54) 3D PRINTING NON-POWERED COMPARTMENTS WITH PASSIVE LATCHES

(71) Applicant: Peridot Print LLC, Palo Alto, CA (US)

(72) Inventors: Albert Rodriguez Fernandez, Sant Cugat del Valles (ES); Marius Valles Gonzalez, Sant Cugat de Valles (ES); Gabriel De La Cal Mendoza, San Cugat del Valles (ES); Joaquim Brugue Garvi, Sant Cugat del Valles (ES); Francesc Melia Sune, San Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 428 days.

(21) Appl. No.: 17/777,232

(22) PCT Filed: Mar. 24, 2020

(86) PCT No.: PCT/US2020/024511
§ 371 (c)(1),
(2) Date: May 16, 2022

(87) PCT Pub. No.: WO2021/194480
PCT Pub. Date: Sep. 30, 2021

(65) Prior Publication Data
US 2022/0402206 A1    Dec. 22, 2022

(51) Int. Cl.
*B29C 64/255* (2017.01)
*B29C 64/232* (2017.01)
(Continued)

(52) U.S. Cl.
CPC .......... *B29C 64/255* (2017.08); *B29C 64/232* (2017.08); *B29C 64/245* (2017.08); *B33Y 30/00* (2014.12)

(58) Field of Classification Search
CPC ... B29C 64/153; B29C 64/165; B29C 64/232; B29C 64/245; B29C 64/255; B33Y 30/00; Y02P 10/25
See application file for complete search history.

(56) References Cited

U.S. PATENT DOCUMENTS

| | | | |
|---|---|---|---|
| 2007/0087071 A1* | 4/2007 | Devos | B29C 64/165 425/375 |
| 2015/0239177 A1* | 8/2015 | Heugel | B29C 64/153 700/119 |

(Continued)

FOREIGN PATENT DOCUMENTS

| | | |
|---|---|---|
| CN | 103447528 A | 12/2013 |
| CN | 107584627 A | 1/2018 |

(Continued)

*Primary Examiner* — Jerzi H Moreno Hernandez
(74) *Attorney, Agent, or Firm* — Shook, Hardy & Bacon L.L.P.

(57) ABSTRACT

A 3D printing apparatus is disclosed herein. The 3D printing apparatus comprises a non-powered compartment defining a chamber to contain build material, and a passive latching element connected to a lateral wall of the compartment to be engaged with a complementary latching element of a platform. A drive mechanism of a 3D printing device is engageable with the platform to apply an upward vertical force to the platform to move the platform upwardly. The complementary latching elements are to: passively latch the platform and the compartment together at a latched position such that upward movement of the platform causes upward movement of the compartment until the compartment is restrained at a sealing position; and to passively unlatch the platform from the compartment, upon further upward movement of the platform.

9 Claims, 7 Drawing Sheets

(51) Int. Cl.
*B29C 64/245* (2017.01)
*B33Y 30/00* (2015.01)

(56) References Cited

U.S. PATENT DOCUMENTS

| | | | |
|---|---|---|---|
| 2016/0318253 A1* | 11/2016 | Barnhart | B29C 64/153 |
| 2018/0001567 A1* | 1/2018 | Juan | B22F 10/10 |
| 2018/0186082 A1* | 7/2018 | Randhawa | B29C 64/393 |
| 2018/0193887 A1* | 7/2018 | Pourcher | B33Y 40/00 |
| 2019/0126544 A1 | 5/2019 | Martin Vidal et al. | |
| 2022/0371271 A1* | 11/2022 | Farreny Agras | B22F 10/14 |

FOREIGN PATENT DOCUMENTS

| | | | | |
|---|---|---|---|---|
| CN | 109080140 A | | 12/2018 | |
| CN | 109261966 A | * | 1/2019 | B22F 3/003 |
| CN | 110153427 A | | 8/2019 | |
| JP | 2013075389 A | * | 4/2013 | |
| RU | 2564604 C1 | | 10/2015 | |
| WO | WO-2019005040 A1 | | 1/2019 | |

* cited by examiner

3D PRINTING NON-POWERED COMPARTMENTS WITH PASSIVE LATCHES

BACKGROUND

Some additive manufacturing or three-dimensional printing systems comprise a removable build unit that interacts with different 3D printing system sub-systems. Some build units comprise a build chamber defining a volume where 3D objects are generated. The build chamber may host a build platform to perform a 3D printing operation in interaction with the 3D printing sub-system in which the build unit resides.

BRIEF DESCRIPTION OF THE DRAWINGS

The present application may be more fully appreciated in connection with the following detailed description of non-limiting examples taken in conjunction with the accompanying drawings, in which like reference characters refer to like parts throughout and in which.

DETAILED DESCRIPTION

The following description is directed to various examples of additive manufacturing, or three-dimensional printing, apparatus and processes to generate high quality 3D objects. Throughout the present disclosure, the terms "a" and "an" are intended to denote at least one of a particular element. In addition, as used herein, the term "includes" means includes but not limited to, the term "including" means including but not limited to. The term "based on" means based at least in part on.

For simplicity, it is to be understood that in the present disclosure, elements with the same reference numerals in different figures may be structurally the same and may perform the same functionality.

Some elements in the examples shown herein are drawn in dotted lines to indicate that the elements may be external elements but may interact with the apparatuses or devices being disclosed therein.

3D printing systems generate a 3D object by executing a series of 3D printing operations. In some 3D printing systems, some of the 3D printing operations are distinct from each other and may be executed by different sub-systems of the 3D printing system (3D printing sub-systems are also referred herein as 3D printing devices). The sub-systems may be different depending on the type of material and 3D printing technology used. Some sub-systems may be physically placed in different locations.

Some removable build units may be attached and detached from the different sub-systems according to the 3D printing system workflow. A build unit may be understood as the module including a build chamber where 3D objects are to be generated during the 3D printing process of a 3D printing system.

Some 3D printing operations may include at least one of loading the removable build unit with build material, heating part of the build unit, selectively solidifying portions of build material from the build unit, ejecting agents (e.g., binding agents, fusing agents, detailing agents, colour agents) to portions of the build material from the build unit, curing the contents of a build unit (e.g., thermally curing), thermally fusing the portions of build material in which fusing agents have been deposited, separating non-solidified build material from the generated 3D objects (i.e., decaking), recycling non-solidified build material, removing 3D objects from the build unit, cleaning the build unit, and the like.

Some sub-systems that perform at least one of the printing operations mentioned above may include at least one of a build material management station, a 3D printer, a curing station, a cleaning station, a deca king station and the like.

Some 3D systems generate 3D objects by selectively processing layers of build material. Suitable powder-based build materials for use in additive manufacturing may include, where appropriate, at least one of polymers, metal powder, and ceramic powder. In some examples build materials may be provided in other forms, such as gels, pastes, and slurries.

As mentioned above, build units may be attached to and detached from different sub-systems in which different 3D printing operations are executed. Typical build units are technically complex independent modules that interact with the different sub-systems of a 3D printing system. Build units comprise a moveable build platform therein to assist in the 3D printing operations execution. Some build units comprise additional mechanisms and equipment to further assist in the 3D printing operations execution. For example, some build units comprise heaters (e.g., resistive heaters or heating blankets) to transfer heat to the contents of the build unit and thereby maintain them at a constant or controlled temperature. Build units also comprise a build platform drive mechanism to cause the movement of the build platform. Hence, build units may comprise expensive and complex equipment that execute 3D printing operations when the build unit is engaged in the appropriate 3D printing sub-system. A fleet of multiple build units raises the cost a 3D printing system since the aforementioned expensive and complex equipment is replicated in each build unit.

A single build unit may be used by different sub-systems to perform different printing operations. Some build unit elements and mechanisms are expensive and are not used in every single sub-system that the build unit interacts with. For this reason, some expensive build unit mechanisms may be used infrequently throughout a complete build unit use cycle.

In some examples, when a build unit is coupled to a 3D printing sub-system, a sealing operation may be executed. As mentioned above, the contents of the build unit may include powder-based build material which is to be isolated from the elements of the 3D printing sub-system (e.g., engines, electronics, heaters). Handling powder-based build material in the build unit may cause the build material to become airborne and pollute other areas of a 3D printing sub-system if not appropriately sealed, which may damage the elements of the 3D printing sub-system. Therefore, in such examples, a sealing operation may be executed prior the performance of the 3D printing operation of the 3D printing sub-system that the build unit is coupled thereto.

Figure 1A:
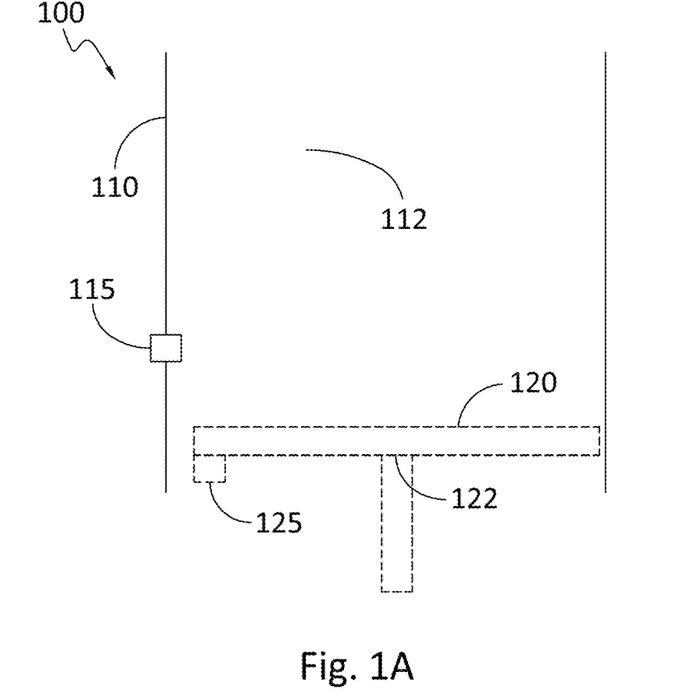
FIG. 1A is a schematic diagram showing an example of a 3D printing apparatus with a non-powered compartment and a passive latching element in a first position.
Figure 1B:
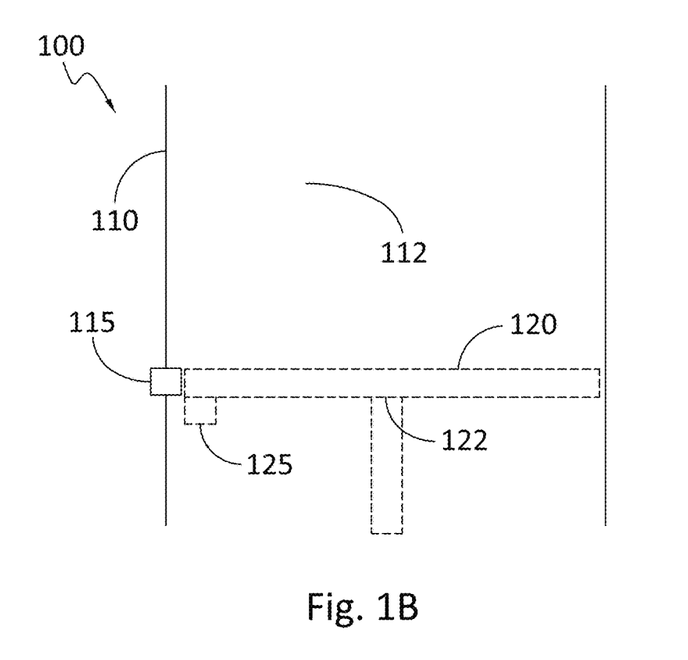
FIG. 1B is a schematic diagram showing an example of a 3D printing apparatus with a non-powered compartment and a passive latching element in a second position.
Figure 1C:
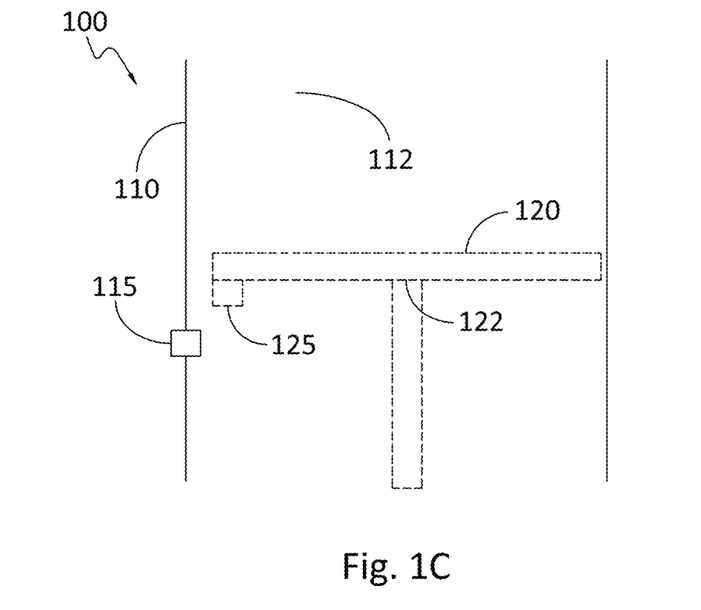
FIG. 1C is a schematic diagram showing an example of a 3D printing apparatus with a non-powered compartment and a passive latching element in a third position.

Referring now to the drawings, FIGS. 1A-1C are schematic diagrams showing a cross-sectional side view of an example of a 3D printing apparatus 100 with a non-powered compartment 110 and a passive latching element 115 in different positions. In some examples, the 3D printing apparatus 100 (referred hereinafter as apparatus 100) is a 3D printing build unit. In other examples, however, the apparatus 100 is a build material reservoir.

The apparatus 100 may be configured as a non-powered single transportable element. The apparatus 100 may be transportable and engageable with different 3D printing sub-systems. In an example, the apparatus 100 is suitable to be used in 3D printing operations in a 3D printer, a build material management station, a decaking station, a curing station, and the like. Therefore, the apparatus 100 may be engageable with receiving interfaces from different 3D printing sub-systems. A more detailed description with reference to a 3D printer is disclosed in some of the examples below (see, e.g., FIGS. 5A-5D).

The apparatus 100 comprises a compartment 110 defining a chamber 112 therein. The compartment 110 is a passive, or non-powered, element by which is meant not comprising any electronic element that needs electrical power to perform its functionality. In some examples, the compartment 110 comprises a lateral wall or a plurality of lateral walls. Additionally, in some examples, the compartment 110 may additionally comprise a top wall. A top wall may be implemented, for example, in the form of a removable sealable lid. The horizontal cross-section of the compartment 110 may be rectangular, circular, rectangular with rounded corners, or any other shape suitable for the generation of a 3D object therein.

In an example in which the apparatus 100 is a build unit, when in use, a 3D printer may generate 3D objects in the chamber 112 out of build material. When it is not in use, the apparatus 100 may not comprise build material or may comprise a full bed of build material and generated 3D objects therein. In another example in which the apparatus 100 is a build material reservoir, when in use, a build material management station may fill the chamber 112 with build material to be used in the generation of a 3D object.

The apparatus 100 is engageable with a platform 120 to perform its functionality. In some examples, the platform 120 is not part of the apparatus 100. In other examples, the platform 120 is part of the apparatus 100. The platform 120 is a passive element. The platform 120 comprises a platform body defining an upper surface on which layers of build material can be formed.

In some examples, the platform 120 may be externally controlled to move within the chamber 112 according to the examples of the present disclosure. The platform 120 comprises a platform drive interface 122 engageable with an external drive mechanism (not shown) to cause the platform 120 to move. The drive mechanism is part of an external 3D printing sub-system engageable with the apparatus 100 (e.g., a 3D printer, a curing station, a build material management station). In an example, the external drive mechanism is controllable to apply an upward vertical force to the platform 120 and thereby move the platform 120 vertically upwardly. The external drive mechanism may also move the platform 120 downwardly. In other examples, however, the external drive mechanism may also move the platform laterally or rotate (e.g., tilt) the platform 120 with respect to a horizontal plane.

The apparatus 100 further comprises a passive latching element 115 connected to or integral with a lateral wall of the compartment 110. The passive latching element 115 (also referred herein as apparatus latching element 115 or latching element 115) is not electrically controlled, thereby being to latch and unlatch based on external mechanical interaction. The apparatus latching element 115 is to be engaged with a complementary platform latching element 125 of the platform 120. In some examples, the platform latching element 125 may be connected to or integral with a lower surface of the platform 120 body to be engaged with the apparatus latching element 115 within the compartment 110.

In the examples herein, the term "to latch" is used to mean holding two elements together and may not necessarily involve a grip or a holding action. In some examples, the term "latch" may be equivalent to "couple".

FIG. 1A illustrates a first position corresponding to a start position, where the platform 120 may be positioned within the compartment 110 at a position below the apparatus latching element 115. Upon the introduction of the apparatus 100, the drive mechanism may couple with the platform 120 through the platform interface 122, so that the height of the platform 120 is controllable through the application of an upward force by the drive mechanism.

The external drive mechanism (not shown) causes the platform 120 to move upwardly until the platform latching element 125 engages with the apparatus latching element 115 (see, e.g., second position illustrated in FIG. 1B). At this position, the engagement between the platform latching element 125 and the apparatus latching element 115 causes the platform 120 and the compartment 110 to passively latch together at a latched position. In the latched position, an upward movement of the platform 120 causes a corresponding upward movement of the compartment 110. In the latched position, the drive mechanism may apply an upward vertical force sufficient for lifting the compartment 110, the platform 120, and the contents of the compartment 110 (if any) up to a sealing position.

In some examples, the compartment 100 may unlatch from the platform when the compartment is moved into a sealing position and a separate locking mechanism from the 3D printing sub-system restrains the compartment 110 at the sealing position. The locking mechanism may engage with a locking interface from the compartment 110. The locking mechanism may be a mechanical system actuatable between its locked and unlocked positions. In another example, the external locking mechanism comprises electronic components that enable it to be controlled by an external controller (not shown) to switch between its locked and unlocked positions. The locking element may be implemented as a pin, screw, grip, or any suitable locking mean to secure the compartment 110 (apparatus 100) to the 3D printing sub-system and restrain the compartment 110, and the contents of the compartment 110, at the sealing position.

As it has been illustrated in FIG. 1C, once the compartment 100 reaches the sealing position, the external drive mechanism may continue to apply an additional upward vertical force to cause the platform 120 to move further upwards and to cause the complementary latching elements 115 and 125 to passively unlatch the platform 120 from the compartment 110.

Figure 3A:
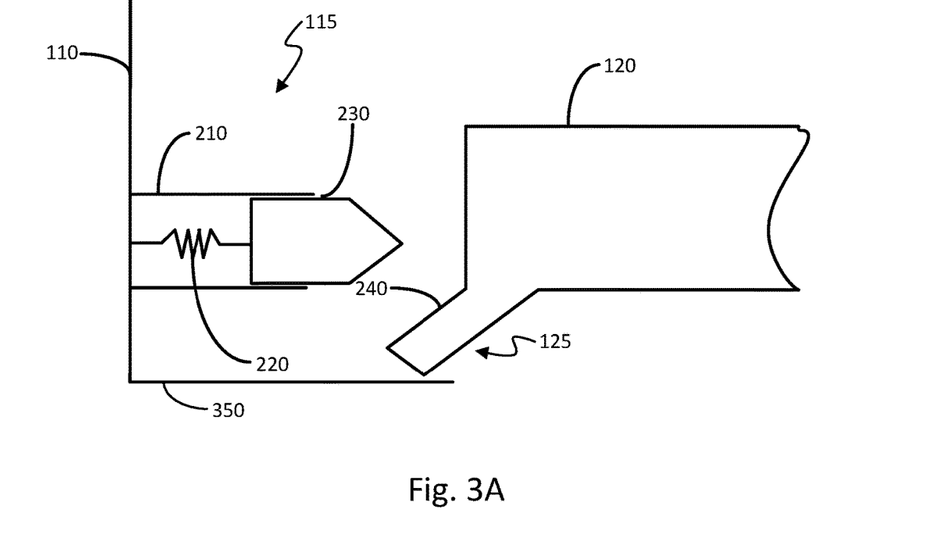
FIG. 3A is a schematic diagram showing an example of a configuration of a 3D printing apparatus and a platform with the corresponding latching elements.
Figure 3B:
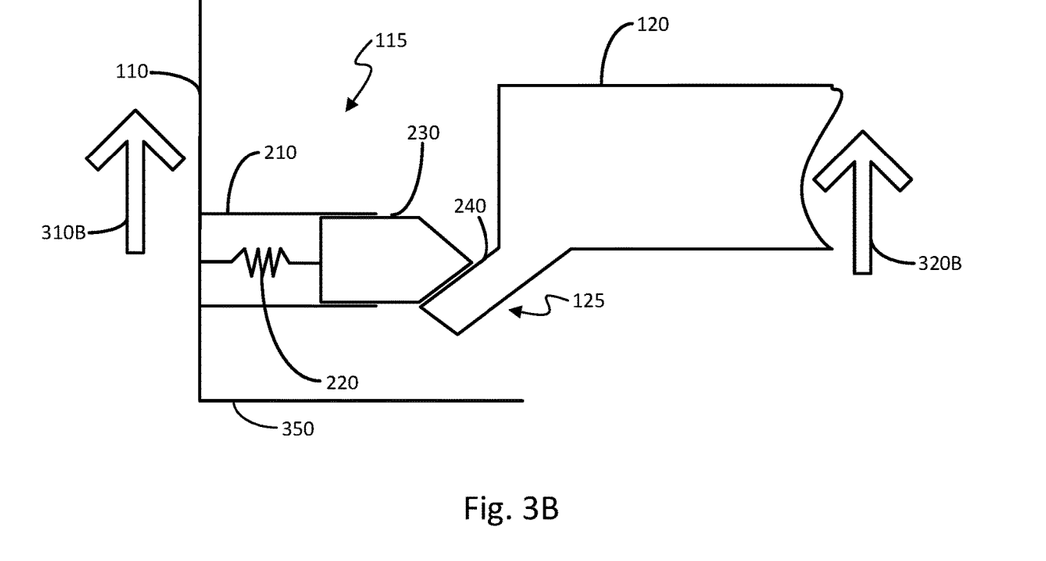
FIG. 3B is a schematic diagram showing an example of another configuration of a 3D printing apparatus and a platform with the corresponding latching elements.
Figure 3C:
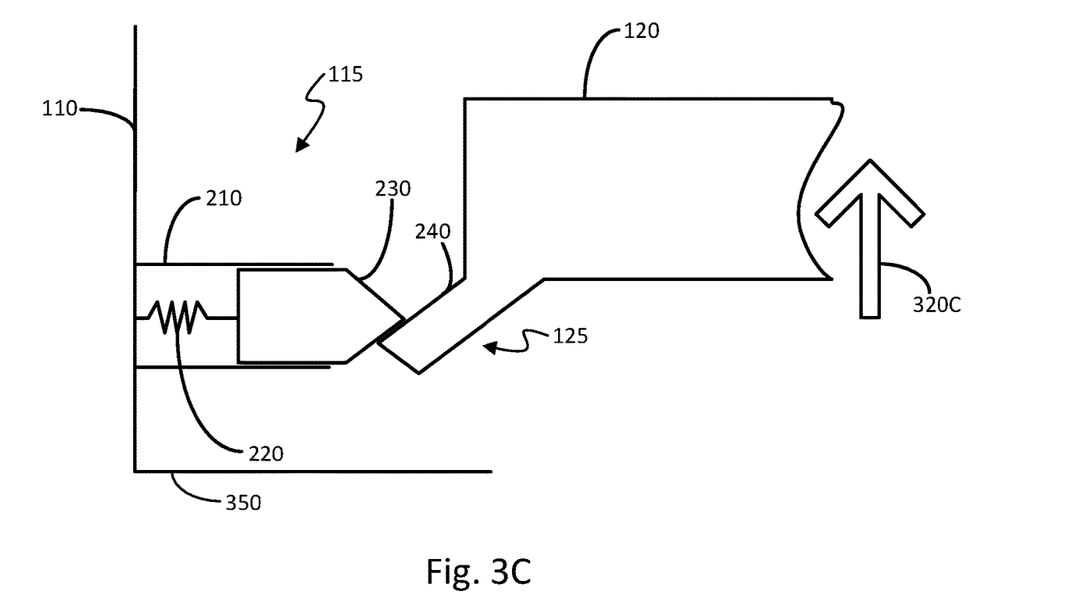
FIG. 3C is a schematic diagram showing an example of another configuration of a 3D printing apparatus and a platform with the corresponding latching elements.
Figure 3D:
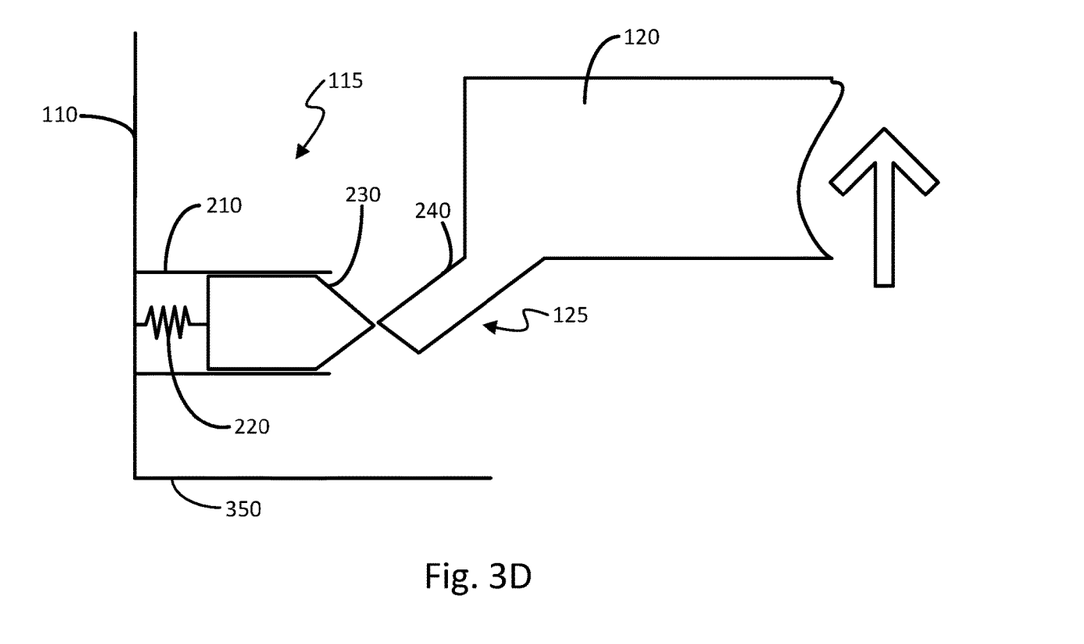
FIG. 3D is a schematic diagram showing an example of another configuration of a 3D printing apparatus and a platform with the corresponding latching elements.
Figure 3E:
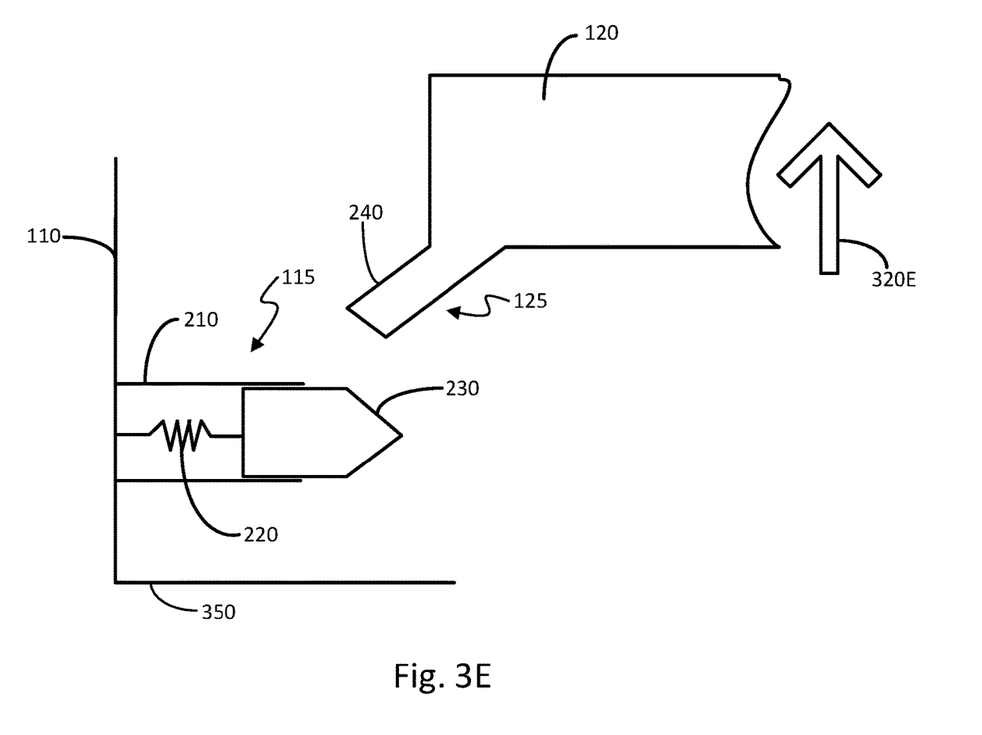
FIG. 3E is a schematic diagram showing an example of another configuration of a 3D printing apparatus and a platform with the corresponding latching elements.
Figure 5A:
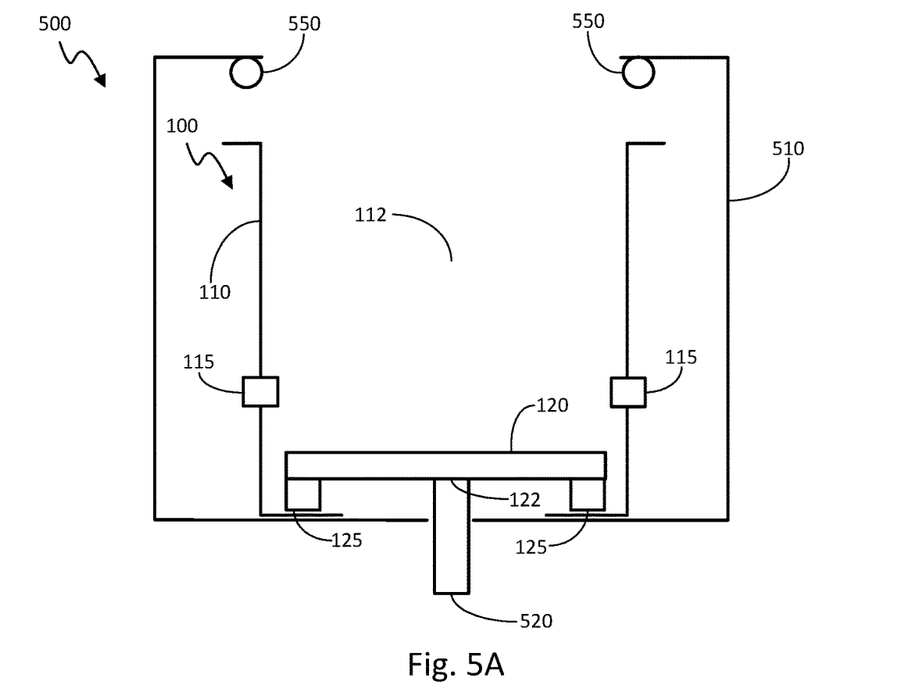
FIG. 5A is a schematic diagram showing an example of a configuration of a 3D printing build unit in a 3D printer.
Figure 5B:
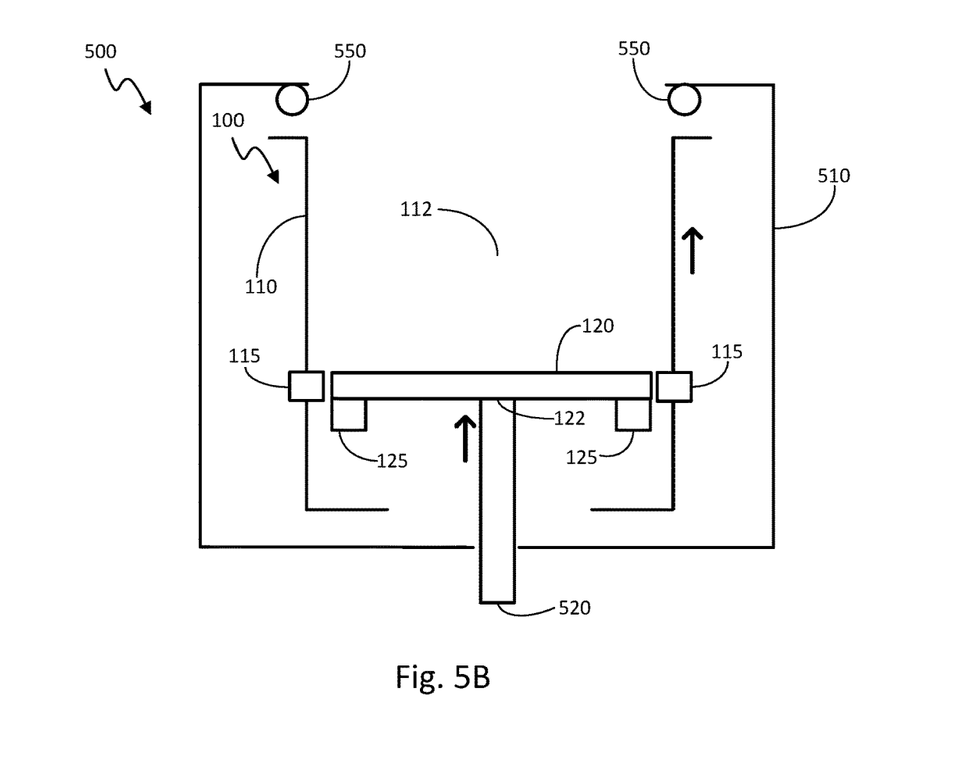
FIG. 5B is a schematic diagram showing an example of another configuration of a 3D printing build unit in a 3D printer.
Figure 5C:
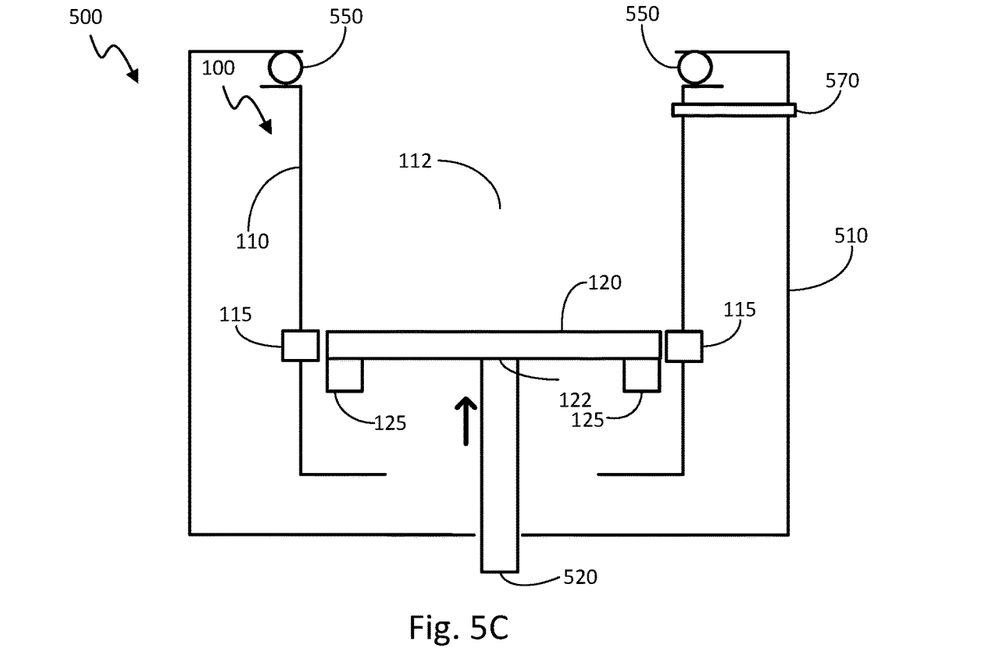
FIG. 5C is a schematic diagram showing an example of another configuration of a 3D printing build unit in a 3D printer.
Figure 5D:
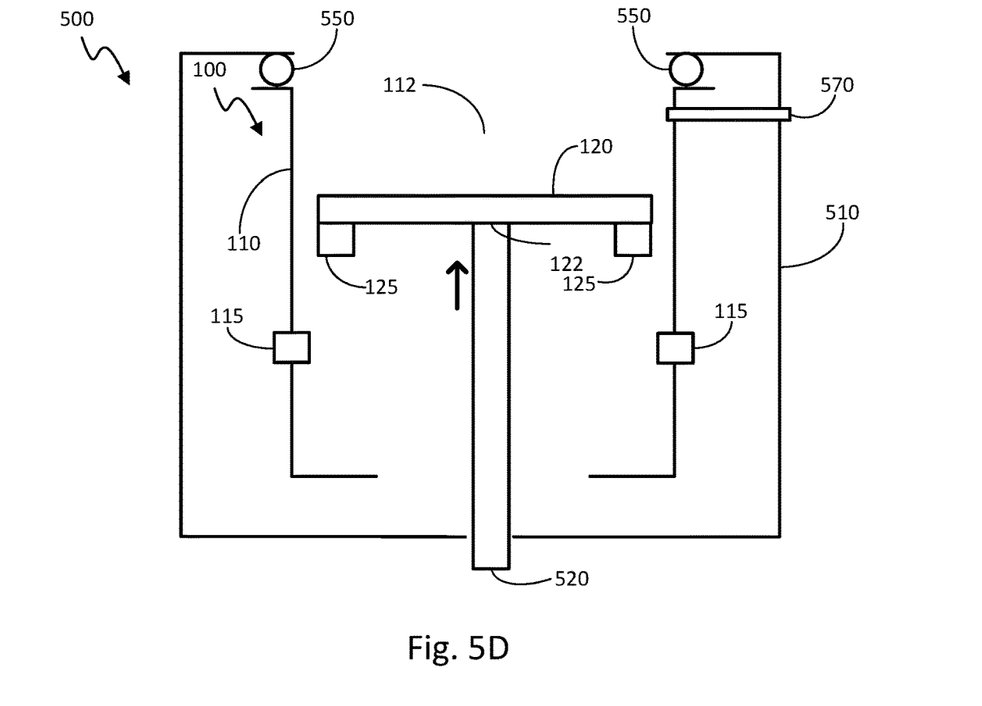
FIG. 5D is a schematic diagram showing an example of another configuration of a 3D printing build unit in a 3D printer.

Once the compartment 110 is secured at the sealing position and the platform 110 is unlatched from the compartment 110, the platform 110 may be controlled to move freely within the chamber 112 and execute a 3D printing operation from the 3D printing sub-system (see, e.g., example implementation of FIGS. 3E and 5D).

In the example in which the 3D printing sub-system is a 3D printer, the drive mechanism may move the platform 120 to a top part of the compartment 110. Then, an external layer forming element from the 3D printer (not shown) may spread build material to generate a layer of build material on the platform 120 or on the uppermost build material layer on the platform 120. Once the layer of build material has been generated, a selective solidification module (not shown) from the 3D printer may selectively solidify portions of the uppermost layer to generate the part of the 3D objects corresponding to the generated layer. Then, the platform 120 may be controlled to move (e.g., downwards) for a distance corresponding to a thickness of the subsequent layer to be generated. The same printing operations may be executed up to the completion of the 3D objects.

The selective solidification module may selectively solidify portions of the uppermost layer of build material in a number of different ways. In an example, the selective solidification module may selectively solidify portions of a layer of build material in a layer-by-layer basis by depositing printing fluids (e.g., fusing agents, detailing agents, property agents, colour agents). In other examples, the selective solidification module may comprise a laser or a laser array to directly selectively solidify portions of a layer of build material; e.g., Selective Laser Sintering (SLS). In other examples, the selective solidification module may selectively deposit binding agents (e.g., thermally curable binder agents, UV curable binder agents) to a layer of build material in a layer-by-layer basis. In yet other examples, the selective solidification module may use other 3D printing techniques to generate a 3D object, for example, Stereolithography (SLA), Digital Light Processing (DLP), Selective Laser Melting (SLM), or the like.

Figure 2A:
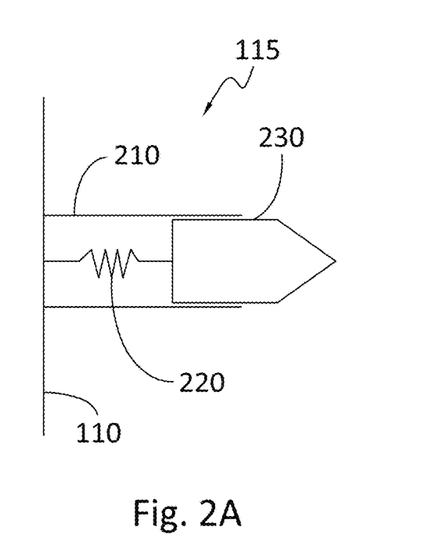
FIG. 2A is a schematic diagram showing an example of a passive latching element from a 3D printing apparatus.
Figure 2B:
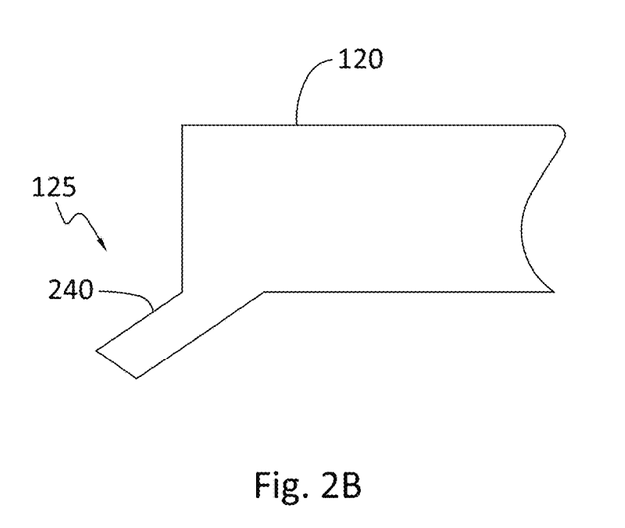
FIG. 2B is a schematic diagram showing an example of a complementary latching element from a moveable platform.

FIGS. 2A and 2B show an example implementation of the complementary latching elements from the examples above. FIG. 2A shows an example of the apparatus latching element 115 from the 3D printing apparatus 100. FIG. 2B shows an example of the platform latching element 125 of the platform 120.

The apparatus latching element 115 of FIG. 2A comprises a compressible element 220 in a housing 210 defining a volume therein. The housing 210 is fixed to a lateral wall of the compartment 110. A first end of the compressible element 220 may be coupled to a lateral wall of the compartment 110 and the second end of the compressible element 220 may be coupled to a follower element 230. When the compressible element 220 is un-compressed, part of the follower element 230 resides within the housing 210 and part of the follower element 230 is outside of the housing 210. The housing 210 horizontally constrains the movement of the follower element 230. Some examples of the compressible element 220 include a spring, a pneumatic element, or any other suitable element that compresses, and un-compresses based on an external force applied.

The follower element 230 is to horizontally move towards the lateral wall of the compartment 110 upon receiving a force from a part of the platform 120 caused by an upward movement of the platform 120. Upon receiving such force, or upon receiving an increased force, the follower element 230 is to compress the compressible element 220. The distance that the compressible element 220 is moved corresponds to the horizontal displacement of the follower element 230. Analogously, upon receiving a reduced force the compressible element 220 expands. When the platform moves upwardly beyond a position at which contact is lost with the follower element 230, the platform ceases to apply the upward force to the follower element 230, the follower element 230 the compressible element 220 return to a start configuration.

The housing 210, the compressible element 220 and the follower element 230 may be integrated as a single latching element 115. In other words, the latching element 115 is a horizontally constrained resiliently loaded element coupled to a lateral wall of the compartment 110.

Turning now to FIG. 2B, the platform latching element 125 comprises a sloped portion 240 coupled to the platform 120. The sloped portion 240 may be implemented as a protrusion which is sloped with respect the horizontal plane. The follower element 230 of the apparatus latching element 115 and the sloped portion 240 of the platform latching element 125 may be designed in such a way that they engage (e.g., latch) upon surface contact. Therefore, the follower element 230 may include one of a pin, a bearing, a cone and/or any shape suitable to engage with the sloped portion 240 from the platform 120.

The sloped portion 240 may have a sloped profile in its upper face, so that the sloped upper face engages with the lower face of the follower element 240 upon upward movement of the platform 120 (i.e., engaging from below the compartment latching element 215). In other examples, the sloped portion may have a first sloped profile in the upper face to engage with the lower face of the follower element 240 upon upward movement of the platform 120, and a second sloped profile in the bottom face to engage with the upper face of the follower element 240 upon downward movement of the platform 120 (i.e., engaging from above the compartment latching element 215). In some additional examples, the first slope profile angle and the second slope profile angle may be the same angle. In other additional examples, the first slope profile angle may be different than the second slope profile angle.

FIGS. 3A-3E depict an example workflow implementation of the complementary latching elements (i.e., apparatus latching element 115 and platform latching element 125) in a 3D printing operation, for example, a sealing operation.

FIG. 3A is an example implementation of the apparatus 100 when the apparatus is introduced in a 3D printing sub-system. The apparatus further comprises a stopper 350 in the compartment 110 below the apparatus latching element 210 to inhibit the movement of the platform 120 below the stopper 350. Once the apparatus 100 is introduced in the 3D printing sub-system, the drive mechanism of the 3D printing sub-system engages with the platform 120 through the platform drive interface 122.

In FIG. 3B, the drive mechanism applies an upward force to move the platform 120 upwardly (arrow 320B). The upward movement of the platform 120, causes the platform latching element 125 (e.g., the sloped portion 240) to engage with the apparatus latching element 115 (follower element 230). This engagement passively couples the platform 120 and the compartment 110 together, so that further upward movement of the platform 120 (arrow 320B), applied by the drive mechanism, causes an upward movement of the compartment 110 (arrow 310B). There is no direct contact between the drive mechanism and the compartment 110 and yet the drive mechanism movement causes upward movement of both the platform 120 and the compartment 110. The platform 120 and the compartment 110 are coupled and move together up to the point that the compartment 110 reaches a sealing position, where it is constrained thereto. In an example, the compartment 110 is constrained (e.g., secured) to the 3D printing sub-system by means of a locking mechanism from the 3D printing sub-system engageable with a locking interface of the compartment 110.

In FIG. 3C, the compartment 110 is constrained at the sealing position. Then, upon further upward movement of the platform 120, the following element 230 may act as a follower mechanism (e.g., cam follower, track follower) with respect to the sloped portion 240 of the platform 120. In this configuration, the drive mechanism may apply a greater force to the platform 120, so that the sloped profile 240 applies a corresponding greater force to the follower element 230. The follower element 230 may then compress the compressible element 220 and thereby move towards the lateral wall of the compartment 110 (i.e., follower mechanism) for a followed distance or displacement. As the follower element 230 acts as a follower mechanism with respect to the sloped portion 240 of the platform 120, the platform 120 keeps moving upwards (arrow 320C) for a distance corresponding to the followed distance until the latching elements reach an unlatching position.

FIG. 3D shows the position in which the platform latching element 125 is about to unlatch from the apparatus latching element 115. At this point, the drive mechanism has to apply a force to the platform 120 greater than a force threshold to cause a further displacement of the follower element 230 such that the platform 120 loses the contact point with the follower element 230 and thereby unlatch the platform 120 from the compartment 110.

FIG. 3E shows the unlatched configuration of the platform 120 and the compartment 110 at the sealing position. In this configuration, the drive mechanism freely moves the platform 120 upwardly (arrow 320E) to allow a 3D printing operation to be executed in the 3D printing sub-system in which the compartment 110 is inserted thereto. As mentioned above, in an example in which the 3D printing sub-system is a 3D printer, the drive mechanism may move the platform 120 to a top part of the compartment 110 and start forming build material layers thereon to be subsequently selectively solidified to generate a 3D object.

Figure 4A:
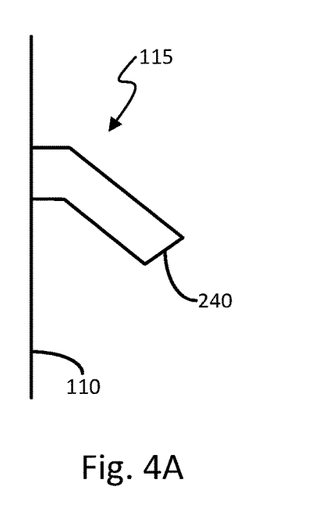
FIG. 4A is a schematic diagram showing an example of another passive latching element from a 3D printing apparatus.
Figure 4B:
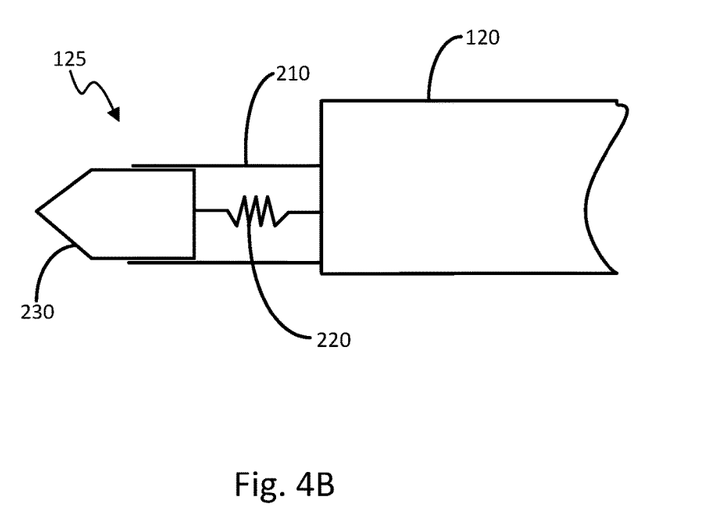
FIG. 4B is a schematic diagram showing an example of another example of a complementary latching element from a moveable platform.

FIGS. 4A and 4B show an alternative example implementation of the complementary latching elements from the examples above. FIG. 4A shows an example of the apparatus latching element 115 from the 3D printing apparatus 100. FIG. 4B shows an example of the platform latching element 125 of the platform 120.

The apparatus latching element 115 is the same as or similar to the platform latching element 125 of FIG. 2B, thereby comprising a sloped portion 240 coupled to the lateral wall of the compartment 110. The platform latching element 125 is the same as or similar to the apparatus latching element 115 of FIG. 2A, thereby being a horizontally constrained resiliently loaded element coupled to the platform 120. In this example, the functionality of the interaction between apparatus latching element 115 and the platform latching element 125 may be the same as or similar to as respectively the functionality of the interaction between the platform latching element 125 and apparatus latching element 115 of FIGS. 2A-B and 3A-E.

Therefore, upon upward movement of the platform 120, the latching element of the apparatus 115 may engage with the complementary platform latching element 125 to passively couple the platform 120 and the compartment 110 together, so that upward movement of the platform 120 causes upward movement of the compartment 110 until the compartment 110 is restrained at the sealing position. Upon further upward movement of the platform 120, the platform complementary latching element 125 acts as a follower mechanism with respect to the sloped portion 240 to move the complementary platform latching element 125 away from the lateral wall of the compartment 110 until the latching elements reach an unlatching position.

FIGS. 5A-D depict an example workflow implementation of a sealing operation of a 3D printing apparatus (e.g., apparatus 100) within a 3D printing sub-system 500. Some elements and processes of FIGS. 5A-D may correspond to some elements of FIGS. 1A-C, 2A-B, and 4A-B and some processes of FIGS. 3A-E. In some examples, the apparatus 100 is a build unit and the 3D printing sub-system 500 is a 3D printer.

FIG. 5A is an example configuration of the apparatus 100 when the apparatus is introduced into a 3D printing sub-system 500 (e.g., a 3D printer), also referred to as 3D printing device 500. The 3D printing device 500 comprises an enclosure 510 to host the apparatus 100, the driving mechanism 520 to apply a vertical force to the platform 120 and move the platform 120 upwardly, a sealing element 550 to seal the contents of the apparatus 100 and a locking mechanism (not shown). Once the apparatus 100 is introduced into the enclosure 510, the drive mechanism 520 engages with the platform 120 through the platform drive interface 122. In FIG. 5A, the relative position between the apparatus 100 and the platform 120 may be the same as or similar to the relative position of the apparatus 100 and the platform 120 depicted in FIG. 3A.

In FIG. 5B, the drive mechanism 520 applies an upward force to move the platform 120 upwardly. The upward movement of the platform 120 causes the platform latching element 125 to engage with the apparatus latching element 115. This engagement passively couples the platform 120 and the compartment 110 together, so that an upward movement of the platform 120 causes an upward movement of the compartment 110. Therefore, the drive mechanism 520 causes the movement of both the platform 120 and the compartment 110 without being in direct contact with the compartment 110. The platform 120 and the compartment 110 are coupled and move together up to the point that the compartment 110 reaches a sealing position. In FIG. 5B, the relative position between the apparatus 100 and the platform 120 may be the same as or similar to the relative position of the apparatus 100 and the platform 120 depicted in FIG. 3B.

In an example, the apparatus latching element 115 and the platform latching element 120 may be the same as the corresponding complementary latching elements of FIGS. 2A and 2B.

In another example, the apparatus latching element 115 and the platform latching element 120 may be the same as the corresponding complementary latching elements of FIGS. 4A and 4B. In yet other example, the apparatus latching element 115 and the platform latching element 120 may be any other equivalent complementary latching mechanism suitable for the examples disclosed herein.

In FIG. 5C, the compartment 110 reaches the sealing position, and a top portion of the compartment makes contact with a sealing element 550. The sealing element may be any suitable element such that at the sealing position, inhibits the contents within the chamber 112 from escaping the chamber 112. In some examples, the sealing element 550 may be a compressible foam of a geometrical shape suitable for isolating the contents of the chamber 112 (e.g., circular-shaped, rectangular-shaped, torus-shaped). In other examples, the sealing element 550 may be a compressible rubber. In yet other examples, the sealing element 550 may not be compressible.

Once the compartment 110 reaches the sealing position, the locking element 570 secures the apparatus 100 to the 3D printing device 500 and restrain the apparatus at the sealing position, so that there is no relative movement between the compartment 110 and the enclosure 510. In FIG. 5C, the relative position between the apparatus 100 and the platform 120 may be the same as or similar to the relative position of the apparatus 100 and the platform 120 depicted in FIGS. 3C and 3D.

In FIG. 5D, once the compartment 110 is restrained at the sealing position, the drive mechanism 520 is to apply an upward force to the platform 120 greater than a force threshold to cause platform latching element 125 to unlatch from the apparatus latching element 115 (see, e.g., example of FIG. 3D). Once the complementary latching elements 115 and 125 unlatch, the drive mechanism 520 freely moves the platform 120 upwardly according to the 3D printing operation to be executed in the 3D printing device 500 (see, e.g., example of FIG. 3E). As mentioned above, in an example in which the 3D printing device 500 is a 3D printer, the drive mechanism 520 may move the platform 120 to a top part of the compartment 110 and start building build material layers thereon to be subsequently selectively solidified to generate a 3D object.

As used herein, the terms "substantially" and "about" are used to provide flexibility to a range endpoint by providing a degree of flexibility. The degree of flexibility of this term can be dictated by the particular variable and would be within the knowledge of those skilled in the art to determine based on experience and the associated description herein.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

There have been described example implementations with the following sets of features:

Feature set 1: A 3D printing apparatus comprising:
a non-powered compartment defining a chamber to contain build material; and
a passive latching element connected to a lateral wall of the compartment to be engaged with a complementary latching element of a platform;
wherein a drive mechanism of a 3D printing device engageable with the platform is to apply an upward vertical force to the platform to move the platform upwardly; and
wherein the complementary latching elements are to:
passively latch the platform and the compartment together at a latched position such that upward movement of the platform causes upward movement of the compartment until the compartment is restrained at a sealing position; and
passively unlatch the platform from the compartment, upon further upward movement of the platform.

Feature set 2: A 3D printing apparatus with feature set 1, wherein the latching element of the apparatus is a horizontally constrained resiliently loaded element coupled to a lateral wall of the compartment that is to: (i) upon upward movement of the platform, engage with a sloped portion of the complementary latching element of the platform to passively couple the platform and the compartment together, so that upward movement of the platform causes upward movement of the compartment until the compartment is restrained at the sealing position; and (ii) upon further upward movement of the platform, act as a follower mechanism with respect to the sloped portion to move the latching element towards the lateral wall of the compartment until the latching elements reach an unlatching position.

Feature set 3: A 3D printing apparatus with any preceding feature set 1 to 2, wherein the horizontally constrained resiliently loaded element comprises at least one of a spring, a pneumatic element, a pin, a bearing and/or a cone.

Feature set 4: A 3D printing apparatus with any preceding feature set 1 to 3, wherein the latching element of the apparatus comprises a sloped portion coupled to a lateral wall of the compartment to: (i) upon upward movement of the platform, engage with the platform complementary latching element, which is a horizontally constrained resiliently loaded element, to passively couple the platform and the compartment together, so that upward movement of the platform causes upward movement of the compartment until the compartment is restrained at the sealing position; and (ii) upon further upward movement of the platform, cause the platform complementary latching element to act as a follower mechanism with respect to the sloped portion to move the complementary latching element from the platform away from the lateral wall of the compartment until the latching elements reach an unlatching position.

Feature set 5: A 3D printing apparatus with any preceding feature set 1 to 4, further comprising a stopper in the compartment below the apparatus latching element to inhibit a movement of the platform below the stopper.

Feature set 6: A 3D printing apparatus with any preceding feature set 1 to 5, further comprising a locking interface engageable with a locking mechanism from a 3D printing device to secure the 3D printing apparatus to the 3D printing device and restrain the apparatus at the sealing position.

Feature set 7: A 3D printing apparatus with any preceding feature set 1 to 5, wherein the 3D printing device is a 3D printer.

a 3D printing apparatus receiving interface to receive an external 3D printing apparatus that comprises:

Feature set 8: A passive platform comprising:
a platform body defining an upper surface on which layers of build material can be formed;
a drive interface engageable with a drive mechanism from a 3D printing device to move the platform vertically;
a passive platform latching element connected to a lower surface of the platform body to be engaged with a complementary latching element of a compartment, wherein the complementary latching elements are to:
passively latch the platform and the compartment together at a latched position such that upward movement of the platform causes upward movement of the compartment until the compartment is restrained at a sealing position, and
passively unlatch the platform from the compartment, upon further upward movement of the platform.

Feature set 9: A passive platform with feature set 8, wherein the latching element of the platform is a horizontally constrained resiliently loaded element coupled to the platform that is to: (i) upon upward movement of the platform, engage with a sloped portion of the complementary latching element of the compartment to passively couple the platform and the compartment together, so that upward movement of the platform causes upward movement of the compartment until the compartment is restrained at the sealing position; and (ii) upon further upward movement of the platform, act as a follower mechanism with respect to the sloped portion to move the latching element away from the lateral wall of the compartment until the latching elements reach an unlatching position.

Feature set 10: A passive platform with any preceding feature set 8 to 9, wherein the horizontally constrained resiliently loaded element comprises at least one of a spring, a pneumatic element, a pin, a bearing and/or a cone.

Feature set 11: A passive platform with any preceding feature set 8 to 10 wherein the latching element of the platform comprises a sloped portion coupled to the platform to: (i) upon upward movement of the platform, engage with the compartment complementary latching element, which is a horizontally constrained resilient loaded element, to passively couple the platform and the compartment together, so that upward movement of the platform causes upward movement of the compartment until the compartment is restrained at the sealing position; and (ii) upon further upward movement of the platform, cause the compartment complementary latching element to act as a follower mechanism with respect to the sloped portion to move the complementary latching element from the compartment towards the lateral wall of the compartment until the latching elements reach an unlatching position.

Feature set 12: A passive platform with any preceding feature set 8 to 11, wherein the sloped profile comprises: (i) a first upper slope to engage with the compartment latching element when the platform engages from below the compartment latching element; and (ii) a second lower slope to engage with the compartment latching element when the platform engages from above the compartment latching element.

Feature set 13: A hosting device with any preceding feature set 8 or 12, wherein the 3D printing device is a 3D printer.

Feature set 14: A 3D printing build unit comprising:
a non-powered compartment defining a chamber to contain build material; and
a passive latching element connected to a lateral wall of the compartment to be engaged with a complementary latching element of a platform, the passive latching element being a horizontally constrained resiliently loaded element,
wherein a drive mechanism of a 3D printing device engageable with the platform is to apply an upward vertical force to the platform to move the platform upwardly; and
wherein the complementary latching elements are to:
upon upward movement of the platform, engage with a sloped portion of the complementary latching element of the platform to passively couple the platform and the compartment together, so that upward movement of the platform causes upward movement of the compartment until the compartment is restrained at a sealing position; and
upon further upward movement of the platform, act as a follower mechanism with respect to the sloped portion to move the latching element towards the lateral wall of the compartment until the latching elements reach an unlatching position.

Feature set 15: A 3D printing build unit with feature set 14, further comprising a locking interface engageable with a locking mechanism from a 3D printer to secure the build unit to the 3D printer and restrain the build unit at the sealing position.

What it is claimed is:

1. A 3D printing device comprising:
a compartment defining a chamber to contain build material, the compartment comprising a passive latching element;
a platform comprising a complementary passive latching element; and
a drive mechanism configured to engage with the platform;
wherein the passive latching element is connected to a lateral wall of the compartment,
wherein the passive latching element is configured to engage with the complementary passive latching element of the platform, wherein one of the passive latching element or the complementary passive latching element comprises a compressible element;
wherein the drive mechanism is configured to apply an upward vertical force to the platform to move the platform upwardly to a latching position, then to a sealing position, and then to an unlatching position;
wherein the passive latching element and the complementary passive latching element are configured to passively latch the platform and the compartment together at the latching position;
wherein an upward movement of the platform from the latching position to the sealing position causes an upward movement of the compartment until the compartment is restrained at the sealing position;
wherein the passive latching element and the complementary passive latching element are configured to passively unlatch the platform from the compartment upon further upward movement of the platform from the sealing position to the unlatching position.

2. The 3D printing device of claim 1, wherein the passive latching element of the compartment comprises the compressible element and is a horizontally constrained resiliently loaded element coupled to the lateral wall of the compartment that is configured to:
upon the upward movement of the platform, engage with a sloped portion of the complementary passive latching element of the platform to passively couple the platform and the compartment together, so that the upward movement of the platform causes the upward movement of the compartment until the compartment is restrained at the sealing position; and upon the further upward movement of the platform, act as a follower mechanism with respect to the sloped portion to move the passive latching element towards the lateral wall of the compartment until the passive latching element and the complementary passive latching element reach an unlatching position.

3. The 3D printing device of claim 2, wherein the horizontally constrained resiliently loaded element comprises at least one of a pin, a bearing and/or a cone, and wherein the compressible element comprises a spring or a pneumatic element.

4. The 3D printing device of claim 1, wherein the complementary passive latching element comprises the compressible element and is a horizontally constrained resiliently loaded element coupled to the platform, and wherein the passive latching element of the compartment comprises a sloped portion coupled to the lateral wall of the compartment configured to:

upon the upward movement of the platform, engage with the complementary passive latching element to passively couple the platform and the compartment together, so that the upward movement of the platform causes the upward movement of the compartment until the compartment is restrained at the sealing position; and upon the further upward movement of the platform, cause the complementary passive latching element to act as a follower mechanism with respect to the sloped portion to move the complementary passive latching element from the platform away from the lateral wall of the compartment until the passive latching element and the complementary passive latching element reach an unlatching position.

5. The 3D printing device of claim 1, further comprising a stopper in the compartment below the passive latching element configured to inhibit a movement of the platform below the stopper.

6. The 3D printing device of claim 1, further comprising a locking interface and a locking mechanism configured to secure the compartment to the 3D printing device and restrain the compartment at the sealing position.

7. The 3D printing device of claim 1, wherein the 3D printing device is a 3D printer.

8. A 3D printing device comprising:
   a compartment defining a chamber to contain build material comprising a passive latching element;
   a platform comprising a complementary passive latching element; and
   a drive mechanism;
   wherein the passive latching element is connected to a lateral wall of the compartment and is configured to be engaged with the complementary passive latching element of the platform, the passive latching element being a horizontally constrained resiliently loaded element;
   wherein the drive mechanism is engageable with the platform and is configured to apply an upward vertical force to the platform to move the platform upwardly to a latching position, then to a sealing position, and then to an unlatching position;
   wherein the passive latching element is configured to engage with a sloped portion of the complementary passive latching element of the platform to passively couple the platform and the compartment together at the latching position;
   wherein an upward movement of the platform from the latching position to the sealing position causes an upward movement of the compartment until the compartment is restrained at the sealing position; and
   wherein upon a further upward movement of the platform from the sealing position to the unlatching position, the passive latching element is configured to function as a follower mechanism with respect to the sloped portion to move the passive latching element towards the lateral wall of the compartment until the passive latching element and the complementary passive latching element reach an unlatching position.

9. The 3D printing device of claim 8, further comprising a locking interface and a locking mechanism configured to secure the compartment to the 3D printing device and restrain the compartment at the sealing position.

* * * * *